United States Patent
Chin

(10) Patent No.: US 7,467,214 B2
(45) Date of Patent: Dec. 16, 2008

(54) INVOKING PROTOCOL TRANSLATION IN A MULTICAST NETWORK

(75) Inventor: Kwan Wu Chin, Dulwich Hill (AU)

(73) Assignee: Motorola, Inc., Schaumburg, IL (US)

( * ) Notice: Subject to any disclaimer, the term of this patent is extended or adjusted under 35 U.S.C. 154(b) by 1295 days.

(21) Appl. No.: 10/600,074

(22) Filed: Jun. 20, 2003

(65) Prior Publication Data

US 2005/0015507 A1    Jan. 20, 2005

(51) Int. Cl.
    *G06F 15/16* (2006.01)
(52) U.S. Cl. ...................... 709/230; 709/245
(58) Field of Classification Search ......... 709/216–230, 709/236, 238, 245–246, 250
    See application file for complete search history.

(56) References Cited

U.S. PATENT DOCUMENTS

| | | | |
|---|---|---|---|
| 6,708,219 B1 * | 3/2004 | Borella et al. ............... | 709/245 |
| 6,785,274 B2 * | 8/2004 | Mahajan et al. ............. | 370/390 |
| 7,158,514 B2 * | 1/2007 | Tsuchiya et al. ............ | 370/390 |
| 7,231,452 B2 * | 6/2007 | Ananda et al. | |
| 7,333,510 B1 * | 2/2008 | Hies et al. .................... | 370/467 |
| 2004/0111494 A1 * | 6/2004 | Kostic et al. ................ | 709/220 |

OTHER PUBLICATIONS

G. Tsirtsis and P. Srisuresh: "Network Address Translation—Protocol Translation (NAT-PT)" Network Working Group, Standards Track, Campio Communications, Feb. 2000.

* cited by examiner

*Primary Examiner*—Yasin M Barqadle

(57) ABSTRACT

A dual-stack host (430) is provided on a multicast network (470) using first and second protocols (450, 460). The dual-stack host (430) detects a first multicast request from a source host (410) to a destination host (420) using a first protocol. The dual-stack host (430) initiates a timer. When the timer expires, the dual-stack host (430) sends a second multicast request message to the destination host (420) using each of the first and second protocols. The dual-stack host (430) monitors whether the destination host (420) responds using one or both of the first and second protocols and determines whether protocol translation is necessary to allow the source and destination hosts to communicate. If required, the dual-stack host (430) then invokes protocol translation to provide the source host (410) with a synthesized address for communicating with the destination host (420).

9 Claims, 6 Drawing Sheets

—PRIOR ART—

US 7,467,214 B2

INVOKING PROTOCOL TRANSLATION IN A MULTICAST NETWORK

FIELD OF THE INVENTION

The present invention relates generally to communications over a distributed network and, in particular, to facilitating communication between hosts using different protocols on a multicast network.

BACKGROUND

Computer networks provide transmission paths between host computers, allowing different host computers to communicate and exchange information with each other. Hosts communicate with each other using established communication protocols.

Transmission Control Protocol/Internet Protocol (TCP/IP) is a set of protocols that allows host computers to share resources across a network. The Internet computer network utilises TCP/IP to enable many computers to communicate with each other. Smaller sub-networks connected to the Internet and private networks also utilise TCP/IP to share network resources among cooperating host computers.

The Internet Protocols (IP) are responsible for routing individual datagrams from a source host computer to an intended destination host computer. Each host connected to an IP network is allocated one or more unique IP addresses. Hosts are allocated addresses either manually or through a Dynamic Host Configuration Protocol (DHCP) server. DHCP is a protocol for automating the configuration of computers that use TCP/IP. Once a host is allocated an address, the host may register its name and address(-es) with a Domain Name System (DNS) server. Registration of the address is performed manually or automatically using a dynamic DNS update protocol.

On a network layer, the IP communication protocols include Internet Protocol version 4 (IPv4) and Internet Protocol version 6 (IPv6). An IPv4 address is a 32-bit number that is typically written as four octets in a "dotted decimal number". An example of an IPv4 address is 215.24.61.139. An IPv6 address is a 128-bit number that is typically expressed using "colon-hexadecimal" notation. Colon-hexadecimal notation divides a 128-bit number along 16-bit boundaries and delimits each 16-bit block with colons. An example of an IPv6 address is 20db:12f3:9c5a:130:fe28:2f3b:f4:1234. IPv6 addresses may also be expressed using the dotted decimal notation. The IPv6 address used as an example above, 20db:12f3:9c5a:130:fe28:2f3b:f4:1234, is written in dotted decimal notation as 8411.4851.40026.304.65064.12091.244.4660. A 16-bit block of contiguous zeros in an IPv6 address may be written in a compressed format as ::, which is known as a "double-colon".

A host that is only capable of operating using the IPv4 protocol is unaware of any IPv6 traffic emanating from an IPv6 host. Similarly, a host only capable of operating using the IPv6 protocol is unaware of any IPv4 traffic on the network. Difficulties arise when hosts operating different protocols want to communicate with one another. A dual-stack host is capable of operating using both protocols. Consequently, a dual-stack host on the Internet computer network is able to communicate with IPv4 hosts and IPv6 hosts.

A translator typically resides at the network layer. The primary functionality of the translator is to modify packet headers, such as translating an IPv4 packet header to an IPv6 packet header and vice versa. Translators include Network Address Translator (NAT) and Stateless Internet Protocol/Internet Control Message Protocol Translator (SIIT).

A proxy is a mechanism that typically operates at the transport layer. Proxies may also operate on higher layers of the Open Systems Interconnect (OSI) Reference Model. An example is where a proxy residing at a gateway terminates a TCP connection from an internal host and initiates a subsequent TCP connection to a target external host. The first leg of the connection could be an IPv4 TCP connection and the second leg an IPv6 TCP connection. An example of a proxy is FaithD.

IPv4/IPv6 translation mechanisms rely heavily on DNS requests to trigger automatically the synthesis of appropriate DNS resource records (RRs) such that two hosts with incompatible stacks are able to communicate through a proxy or translator. Examples of translation/transition mechanisms include Network Address Translation—Protocol Translation (NAT-PT), FaithD and SIIT.

A Domain Name System Application Level Gateway (DNS-ALG) plays a significant role in the operation of translation/transition mechanisms. The DNS-ALG is responsible for intercepting DNS requests from hosts, determining the capabilities of target hosts, and synthesizing appropriate RRs that cause all packets from a requesting host to be routed through a given translation/transition mechanism. For example, a DNS query from an IPv6 host for an AAAA/A6 resource record-(RR) of an IPv4 host results in the synthesis of an AAAA/A6 RR constructed from a translator/proxy specific IPv6 prefix and the IPv4 host's address.

DNS-ALG is also responsible for creating dynamic mappings at the onset of IPv4-only to IPv6-only communications. The DNS-ALG creates a dynamic mapping containing the IPv6 address of the last queried IPv6 host whenever an IPv4 host wants to talk to an IPv6 host. The dynamic state serves to associate an incoming connection with the last DNS query so that a translator/proxy knows for which IPv6 host an incoming IPv4 connection is destined.

Networks that contain IPv4 and IPv6 hosts utilise IPv4/IPv6 translators to facilitate communication between IPv4 and IPv6 hosts. A DNS server in such a network is not usually aware of any translation capabilities. "*Network Address Translation—Protocol Translation(NAT-PT)*" G. Tsirtsis and P. Srisuresh (2000), IETF RFC 2766 provides an Application Level Gateway (ALG) that acts as a proxy to a DNS server. The ALG appears to be a normal DNS server to each host on the network. In such a network, all of the hosts are configured to send DNS queries to the DNS-ALG. Typically, DNS requests are intercepted by a DNS-ALG that is aware of a special prefix used by a given IPv4/IPv6 translator/proxy. The DNS-ALG determines the address types involved, IPv4 or IPv6, depending on the address type queried and the address type(s) registered in the DNS. The DNS-ALG then returns an address constructed from a special prefix to the query host, resulting in a connection being established to the translator/proxy instead of the true destination host.

FIG. 1 shows a schematic block diagram representation of a portion 100 of a Prior Art network that utilises a DNS-ALG. A host 110 sends a DNS request 115 to a DNS-ALG 120 for an address of an intended destination host. The DNS-ALG 120 receives the request 115 and forwards the request 125 to a DNS server 130 for resolution. The DNS server 130 responds to the DNS-ALG 120 with a reply 135. If the DNS-ALG 120 receives a positive reply, the DNS-ALG 120 does not perform additional processing and the DNS-ALG 120 returns a resolved address to the Host 110 in message 140.

If the DNS server 130 is unable to resolve the initial request 125, the reply 135 from the DNS 130 is negative, indicating the address of the intended destination host was not found. The DNS-ALG 120 receives the negative reply 135 and sends a second query to the DNS-server 130, the second query being different from the initial query. If the initial query was for an A RR, an IPv4 address, the second query is for an AAAA/A6 RR, an IPv6 address. In this first scenario, a positive reply from the DNS server 130 to the DNS-ALG 120 indicates that the intended destination host has an IPv6 address, rather than an IPv4 address. Conversely, if the initial query was for an AAAA/A6 RR, an IPv6 address, the second query is for an A RR, an IPv4 address. In this second scenario, a positive reply from the DNS server 130 to the DNS-ALG 120 indicates that the intended destination host has an IPv4 address, rather than an IPv6 address.

The DNS-ALG 120 establishes an appropriate mapping, if necessary, and returns an address with a special prefix in message 140 to the host 110. The special prefix causes all packets with an address bearing that prefix to be routed to an IPv4/IPv6 translator/proxy. Host 110 uses the address when sending datagrams intended for that destination host. The special prefix in the address ensures that all packets carrying the address are routed to a translator/proxy.

In a preferred embodiment, the initial request 125 from the DNS-ALG 120 to the DNS server 130 includes a query for each of the A and AAAA/A6 RRs of the intended destination host. The DNS-ALG responds to the DNS-ALG 120 with a reply 135 that indicates whether the DNS server 130 is able to resolve either an IPv4 or an IPv6 address for the intended destination host. The DNS-ALG 120 determines from the reply 135 whether the host 110 and the intended destination host are compatible and establishes an appropriate mapping, if necessary.

The use of a DNS-ALG relies on the existence in the network of a centralised name server to determine whether a translator is required to facilitate communication between hosts operating in accordance with different protocols.

Upon receipt of an incoming connection, the translator/proxy may ask the DNS-ALG for the true destination or address. Alternatively, the translator/proxy may be able to infer the address from the destination address of the incoming connection. The translator/proxy then sets up a subsequent connection or translates all packet headers appropriately. The IP address of the DNS-ALG is usually passed to end hosts through DHCP as the address of the name server. As a result, all DNS requests are intercepted by the DNS-ALG, which determines whether a translator or proxy needs to be involved to facilitate the communication.

A network using a multicast domain name system (mDNS) may include a number of hosts distributed across the network, each host maintaining its own name and other resource records. There is no central node, such as a conventional DNS server, in which DNS requests can be intercepted and processed to determine whether a translator/proxy needs to be invoked to enable subsequent connections. Accordingly, each host is responsible for performing name-to-address resolution.

Network Basic Input Output System (NetBIOS) is another example of a multicast network. In NetBIOS multicast environments, a dual-stack host comprising a multicast NetBIOS Application Level Gateway (mNetBIOS-ALG) listens to NetBIOS requests. The mNetBIOS-ALG performs in a similar manner to the DNS-ALG described above to determine the capabilities of an intended destination host. However, the mNetBIOS-ALG operates on NetBIOS packets transmitted over IPv4 and IPv6, rather than DNS requests.

A further example of a multicast network is Service Discovery Protocol (SDP). To determine the capabilities of an intended destination host, a multicast Service Discovery Protocol Application Level Gateway (mSDP-ALG) listens to service discovery requests transmitted from IPv4 and IPv6 nodes. The mSDP-ALG determines the capabilities of an intended destination host be retransmitting a received Service Location Protocol (SLP) query over IPv4 or IPv6. The intended destination host may then reply using either IPv4 or IPv6, depending on the destination host's capabilities. The reply from the destination host may also include service attributes including IPv4 or IPv6 addresses.

Once the mSDP-ALG determines the capabilities of the destination host, the mSDP-ALG synthesizes an address and rewrites all IP addresses in the SLP reply from the destination host with the synthesized address. Thus, if the destination host is IPv6 and the source host is IPv4, all IPv6 addresses in the SLP reply from the destination host are rewritten as a synthesized IPv4 address. Alternatively, if the destination host is IPv4 and the source host is IPv6, all IPv4 addresses in the SLP reply from the destination host are rewritten as a synthesized IPv6 address.

As mDNS networks do not feature a central name server, a mechanism does not exist for determining when protocol conversion is required to allow hosts using different protocols to communicate with each other. Thus, a need exists to improve communication capabilities among host computers in a multicast computer network.

SUMMARY

According to an aspect of the present invention, there is provided a method of invoking protocol translation in a multicast network supporting first and second protocols. The method includes the steps of detecting a first multicast request sent from a source host to a destination host using a first protocol and sending, after a predetermined time, a second multicast request to the destination host using each of the first and second protocols. The method then invokes protocol translation to facilitate communication between the source host and the destination host, if a reply to the second multicast request is received from the destination host using the second protocol and no reply is received from the destination host using the first protocol.

According to another aspect of the invention, there is provided a system for invoking protocol translation in a multicast network supporting first and second protocols. The system includes a network interface for communicating with the network, a memory for storing information and a processor coupled to the memory and the network interface. The system also includes a dual-stack host implemented using the memory and the processor.

The dual-stack host detects a first multicast request sent from a source host to a destination host using a first protocol. The dual-stack host then sends, after a predetermined time, a second multicast request to the destination host using each of the first and second protocols. If a reply to the second multicast request is received from the destination host using the second protocol and no reply is received from the destination host using the first protocol, the dual-stack host invokes protocol translation to facilitate communication between the source host and the destination host.

According to a further aspect of the invention there is provided a multicast system supporting first and second protocols. The multicast system includes a transmission link supporting first and second protocols and a plurality of host computing devices coupled to the transmission link. The system also includes a dual-stack host coupled to the transmission link and operable in accordance with each of the first and second protocols. The dual-stack host monitors the transmission link for multicast requests and upon detecting a first multicast request from a source host computing device to a destination host computing device using a first protocol, sends a second multicast request to the destination computing device using each of the first and second protocols.

The dual-stack host invokes protocol translation, when a reply from the destination host computing device is received using the second protocol and no reply is received from the destination host computing device using the first protocol. The multicast system also includes a proxy mechanism coupled to the transmission link. The proxy mechanism generates a proxy address for the destination host computing device using the first protocol to facilitate communication between the source host computing device and the destination host computing device.

Other aspects of the invention are also disclosed.

BRIEF DESCRIPTION OF THE DRAWINGS

One or more embodiments of the present invention are described with reference to the drawings, in which:

FIG. 9b is a schematic block diagram representation of a computing device in a multicast network implementing the dual-stack host of FIG. 9a.

DETAILED DESCRIPTION

Figure 1:
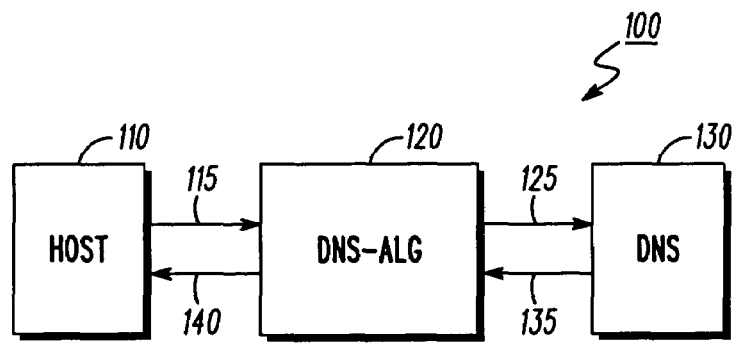
FIG. 1 is a schematic block diagram representation of a Prior Art sub-network depicting a host computer sending a DNS request to a DNS-ALG.

A method and a system for invoking protocol translation in a multicast network supporting first and second protocols are disclosed hereinafter. Further, a multicast domain name system supporting first and second protocols is also disclosed. In the following description, numerous specific details, including the Rendezvous technology, translators and proxies are set forth. However, from this disclosure, it will be apparent to those skilled in the art that modification and/or substitutions may be made without departing from the scope and spirit of the invention. In other circumstances, specific details may be omitted so as not to obscure the invention.

The method for invoking protocol translation in a multicast network supporting first and second protocols may be implemented in modules. A module, and in particular its functionality, can be implemented in either hardware or software. In the software sense, a module is a process, program, or portion thereof, that usually performs a particular function or related functions. Such software may be implemented in Java, C, C++, Fortran, for example, but may be implemented in any of a number of other programming languages/systems, or combinations thereof. In the hardware sense, a module is a functional hardware unit designed for use with other components or modules. For example, a module may be implemented using discrete electronic components, or it can form a portion of an entire electronic circuit such as an Field Programmable Gate Arrays (FPGA), Application Specific Integrated Circuit (ASIC), and the like. A physical implementation may also include configuration data for a FPGA, or a layout for an ASIC, for example. Still further, the description of a physical implementation may be in EDIF netlisting language, structural VHDL, structural Verilog or the like. Numerous other possibilities exist. Those skilled in the art will appreciate that the system can also be implemented as a combination of hardware and software modules.

Where reference is made in any one or more of the accompanying drawings to steps and/or features that have the same reference numerals, those steps and/or features have for the purposes of this description the same function(s) or operation(s), unless the contrary intention appears.

I. Overview

Disclosed are arrangements that provide a dual-stack host that determines when a translation between first and second communication protocols is required to enable two hosts to communicate with each other in a multicast network. In a preferred exemplary embodiment, the multicast network is a multicast domain name system network and the first and second communication protocols are IPv4 and IPv6. In such an mDNS network, a source host multicasts a request over the network on a first protocol to an intended destination host. The request from the source host asks for the IP address of the destination host's name. Hosts on the network that are able to communicate on the first protocol detect the request. Each of these hosts examines the request and determines whether the request is intended for that host. If a host determines that the request is not intended for that host, that host ignores the request.

If the destination host operates on the first protocol, the destination host receives the original request message from the source host and responds directly to the source host using a unicast message. The unicast message is a DNS reply that contains an answer section containing the resolved address of the destination host on the first protocol. If, however, the destination host acts on a different protocol from the first protocol used by the source host, the destination host does not detect the original request from the source host.

In accordance with an embodiment of the present invention, a dual-stack host able to communicate with first and second protocols (e.g., IPv4 and IPv6) is provided on an mDNS network. The dual-stack host monitors the network for multicast datagrams. The dual-stack host detects the original mDNS request from the source host and initiates a timer. When the timer reaches a predetermined threshold, the dual-stack host sends a multicast request message to the destination host using each of the first and second protocols.

In the case in which the destination host operates using the same protocol as the source host, the dual-stack host is unaware of the unicast response sent from the destination host to the source host. However, the dual-stack host receives a unicast response from the destination host due to the dual-stack host's request using the first protocol. As the dual-stack host is aware that the destination host operates using the same protocol as the source host, the dual-stack host determines that there is no need to invoke protocol translation.

If the dual-stack host does not receive a response from the destination host using the first protocol, but does receive a response from the destination host using the second protocol, the dual-stack host determines that the source and destination hosts operate different protocols and that protocol translation is necessary to allow the source and destination hosts to communicate with each other. The dual-stack host then invokes protocol translation by synthesizing an appropriate RR to allow the source and destination hosts to communicate with each other.

Figure 2:
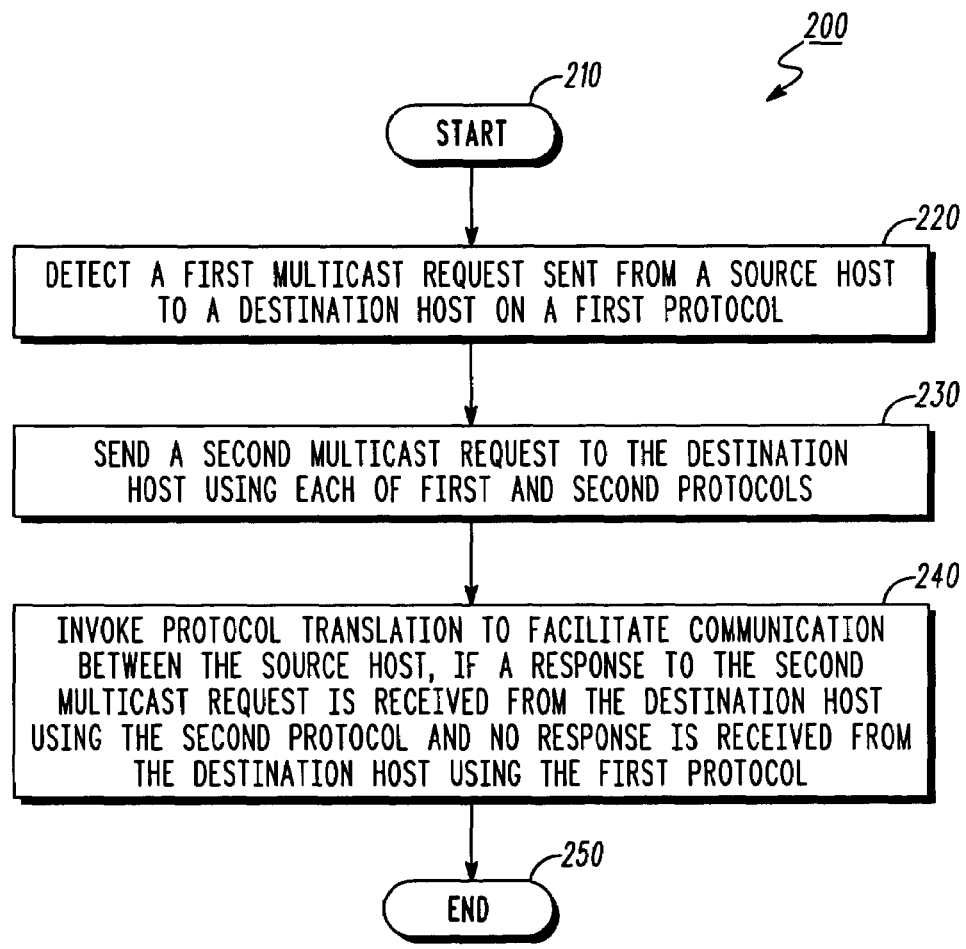
FIG. 2 is a flow diagram of a method of invoking protocol translation in a multicast network according to an embodiment of the present invention.

FIG. 2 is a flow diagram illustrating a method 200 of invoking protocol translation in a multicast network according to an embodiment of the present invention. In step 210, a multicast network operating first and second protocols is idle. In step 220, a first multicast request sent on a first protocol from a source host to a destination host is detected. In step 230, a second multicast request is sent to the destination host using each of the first and second protocols. In step 240, protocol translation is invoked to facilitate communication between the source host and the destination host, if a response to the second multicast request is received from the destination host using the second protocol and no response is received from the destination host using the first protocol. In step 250, the method terminates. Further details of the method 200 are described hereinafter.

II. Method of Invoking Protocol Translation

An embodiment of the invention provides a dual-stack host to detect multicast messages sent from a source host to an intended destination host in a multicast network for the purpose of instigating automatic protocol translation. The dual-stack host determines whether protocol translation is necessary to allow a multicast request to reach the intended destination. If translation is required, the dual-stack host of the embodiment resolves the request on behalf of the intended destination.

Figure 3:
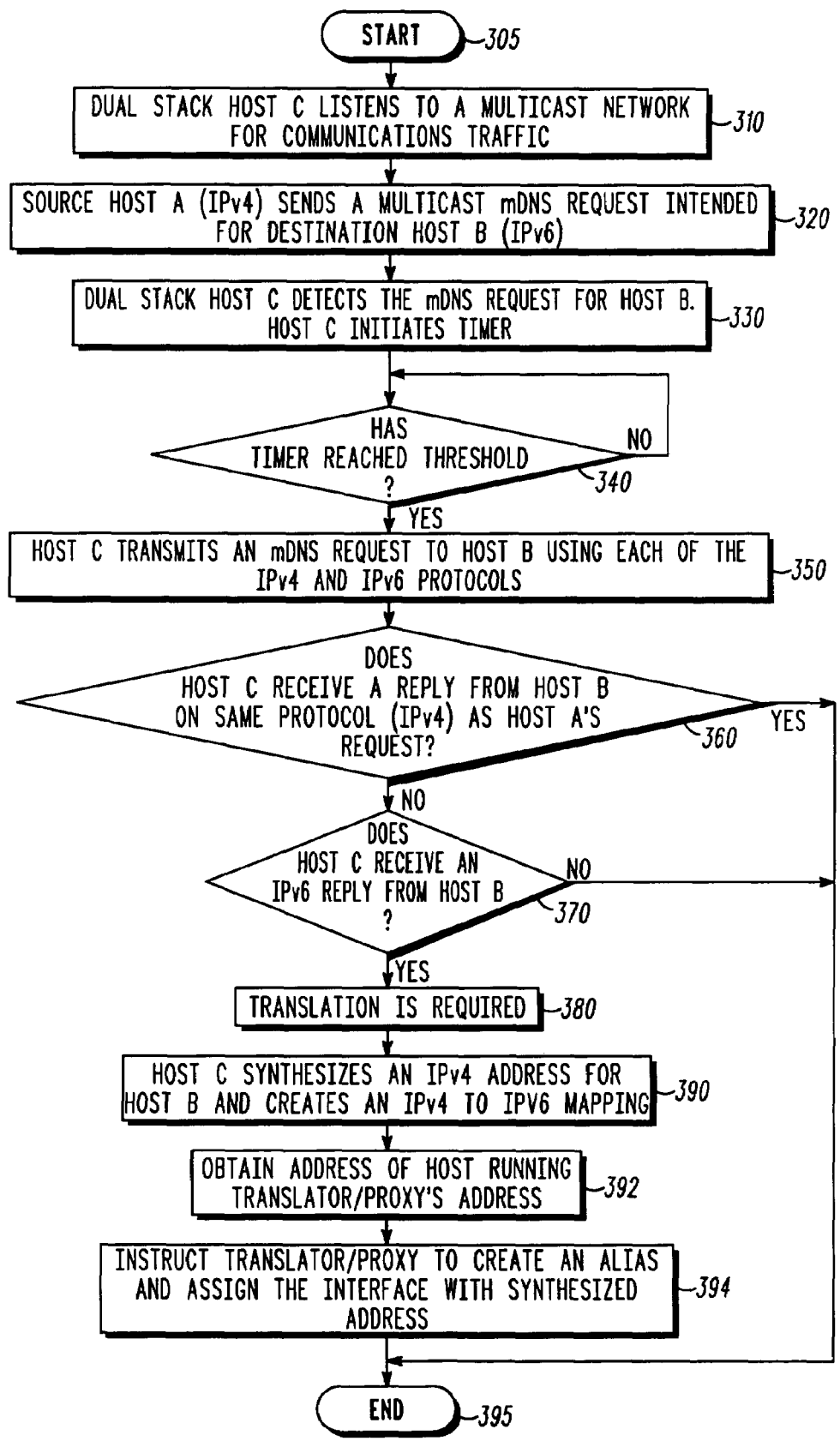
FIG. 3 is a flow diagram of a method of invoking protocol translation in a multicast domain name system network according to another embodiment of the present invention.

FIG. 3 is a flow diagram of a method 300 of invoking protocol translation in a multicast domain name (mDNS) network according to an embodiment of the present invention. At the start of processing 305, an mDNS network having several hosts connected to the network is idle. The mDNS network does not have a central name server. Processing flows to step 310, in which a dual-stack host C able to operate in accordance with both protocols IPv4 and IPv6 listens to the multicast network for all communications traffic.

Processing then flows to, step 320, in which a source host A operating in accordance with protocol IPv4 sends a multicast request intended for a destination host B. Unbeknownst to host A, destination host B only operates in accordance with protocol IPv6. Processing passes to step 330, in which host C detects the multicast request from host A and initiates a timer.

Decision step 340 determines whether the timer in host C is equal to a predetermined threshold. If the timer is yet to reach the threshold (N), processing loops to step 340 and the timer is re-examined. If the timer in step 340 is greater than or equal to the threshold (Y), processing passes to step 350, in which host C transmits a new mDNS request to the intended destination host B using each of the IPv4 and IPv6 protocols. Host C may send two separate mDNS requests, one using each of the IPv4 and IPv6 protocols, respectively. Alternatively, as mDNS requests may contain multiple queries, host C may transmit a single mDNS request containing an IPv4 query and an IPv6 query.

If host B is capable of operating on the IPv4 protocol, host B receives the initial request from source host A and replies in a unicast response. Initially, host C is unaware of such a unicast response and is thus as yet unaware of host B's functionality. Accordingly, the new mDNS requests in step 350 from host C on IPv4 and IPv6 seek to determine host B's functionality.

Processing passes from step 350 to step 360, which checks whether host C receives a reply from host B on the same protocol as the request sent by host A in step 320. If dual-stack host C receives an IPv4 response from host B (Y), host C determines that host B is capable of operating on the IPv4 protocol and processing terminates in step 395. As host B is capable of using the IPv4 protocol, host C concludes that no translation between the IPv4 and IPv6 protocols is required to enable host A and host B to communicate with each other. Accordingly, no further action is required of host C.

However, if at step 360 host C does not receive a reply to the IPv4 request from step 350 (N), host C determines that host B does not possess IPv4 functionality. Accordingly, processing flows to step 370, which checks whether host C receives an IPv6 reply from host B. If no IPv6 reply is forthcoming from host B (N), processing terminates in step 395. As host B provides no response to either of the IPv4 and IPv6 requests from step 350, host C assumes that host B does not exist and no further action is required.

If at step 370 host C receives an IPv6 reply from host B (Y), control passes to step 380 in which dual-stack host C determines that protocol translation is required to enable IPv4 host A to communicate with IPv6 host B. Processing then passes to step 390 in which host C invokes a protocol translation from IPv4 to IPv6 by sending a synthesized IPv4 address for IPv6 host B to IPv4 host A. Processing flows to step 392 in which host C obtains the address of the host that is running a translator/proxy. If the translator/proxy is co-resident with an mDNS-ALG in host C, the translator/proxy and the. DNS-ALG may communicate using an operating system specific mechanism, such as using a UNIX Inter-Process-Communication (IPC) channel.

Processing passes to step 394. Once a communication channel is selected, the translator/proxy is instructed to create an alias using the synthesized address on a network interface listening to the communication channel. Alternatively, the assignment of an alias may be performed by the DNS-ALG. The address alias is used so that a dual-stack host operating an IPv4/IPv6 translator is able to pick up, from the communication channel, packets bearing the synthesized address in the destination field. In a network utilising the Unix operating system, an alias is created by running the "ifconfig<interface-label><address information>alias".

The dual-stack host then forwards those packets to the translator for processing. Finally, processing terminates in state 395.

The dual-stack host performs the protocol translation in step 390 by making a decision based on the results of formulating a number of requests for different resource records (RRs). The dual-stack host returns to the source host A a synthesized RR on behalf of the queried destination host B. As a result, the source host A making the query establishes a connection to the synthesized address to a translator or proxy. The translator or proxy may reside on the dual-stack host C, or alternatively on some other node that is dedicated to facilitating. IPv4/IPv6 communications. This process is illustrated hereinafter with reference to the system network 400 of FIGS. 4 and 5.

The method 300 has been described with reference to the source host A operating in accordance with IPv4 and the destination host B operating in accordance with IPv6. However, it will be readily apparent to those skilled in the art in the light of this disclosure that the process 300 is readily applicable to the case where the source host A operates in accordance with IPv6 and the destination host B operates in accordance with IPv4. The method 300 may be readily modified by replacing references to IPv4 with IPv6, and vice versa. For ease of description only, the method 300 has been described with the source host being IPv4 and the destination host being IPv6.

Figure 9A:
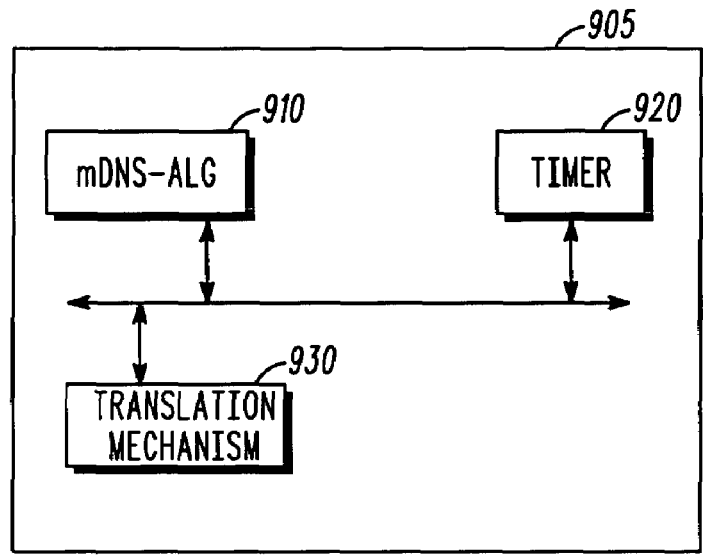
FIG. 9a is a schematic block diagram representation of functional modules of a dual-stack host for invoking protocol translation in a multicast domain name system.

FIG. 9*a* is a schematic block diagram representation of functional modules of a dual-stack host 905 for invoking protocol translation in a multicast domain name system. The dual-stack host 905 includes an mDNS-ALG module 910, a timer module 920 and a translation mechanism module 930. The mDNS-ALG module 910 is coupled to the timer module 920. The mDNS-ALG module 910 is also coupled to the translation mechanism module 930.

When the dual-stack host 905 detects a first multicast request sent from a source host to a destination host using a first protocol, the mDNS-ALG module 910 instructs the timer module 920 to initiate a timer. Once the timer has reached a predetermined threshold, the mDNS-ALG 910 sends a second multicast request to the destination host using each of the first and second protocols. If a response to the second multicast request is received from the destination host using the second protocol and no reply is received from the destination host using the first protocol, the mDNS-ALG module 910 synthesizes an address. In a preferred embodiment, the mDNS-ALG 910 informs the translation mechanism 910 of the synthesized address. Subsequently, mDNS-ALG 910 creates an alias on a network interface where the synthesized address is assigned to the interface. Alternatively, the mDNS-ALG 910 instructs the translator 930 to create an alias on the corresponding interface.

Figure 9B:
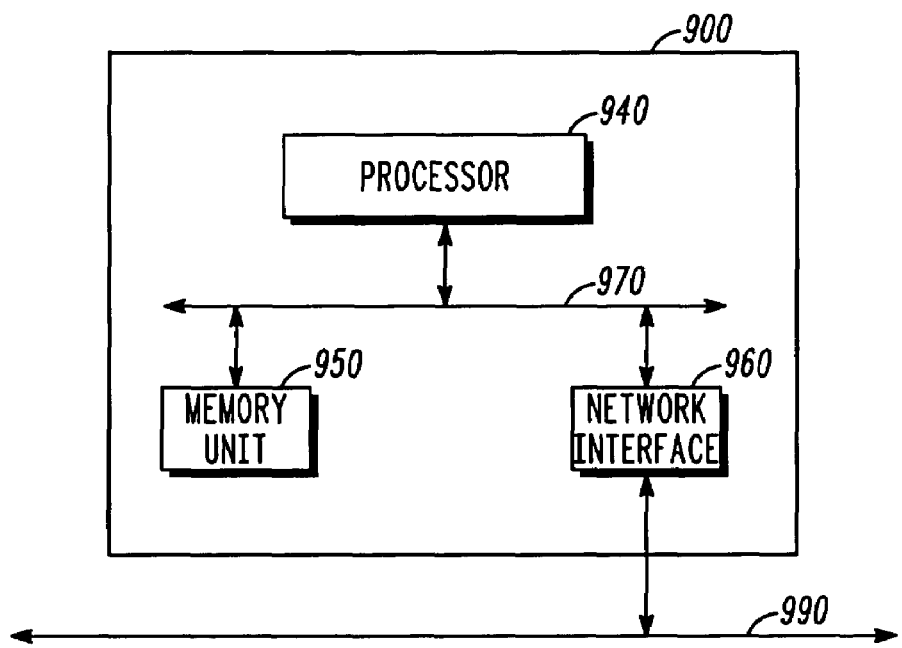

FIG. 9*b* is a schematic block diagram representation of a computing device 900 that can implement the dual-stack host 905 in a multicast network supporting first and second protocols. The computing device 900 is shown in the form of component hardware modules. The computing device 900 includes a processor 940 that is a processing unit that processes data and carries out instructions, well known to those skilled in the art. The instructions may be carried out by interpreting and/or executing such instructions. For example, the processor 940 may be implemented using a Pentium class processor manufactured by Intel Corporation.

The computing device also includes a memory unit 950, for example formed from semiconductor random access memory (RAM) and read only memory (ROM), and a network interface 960. Each of the processor 940, the memory unit 940 and the network interface is coupled to an internal bus 970. The network interface 960 couples the computing device 905 to a network transmission link 990.

The memory unit 950 stores data received from the network transmission link 990 via the network interface 960. The memory unit can also store data received from the processor 940 that is to be sent to the network transmission medium via the network interface 960.

Figure 4:
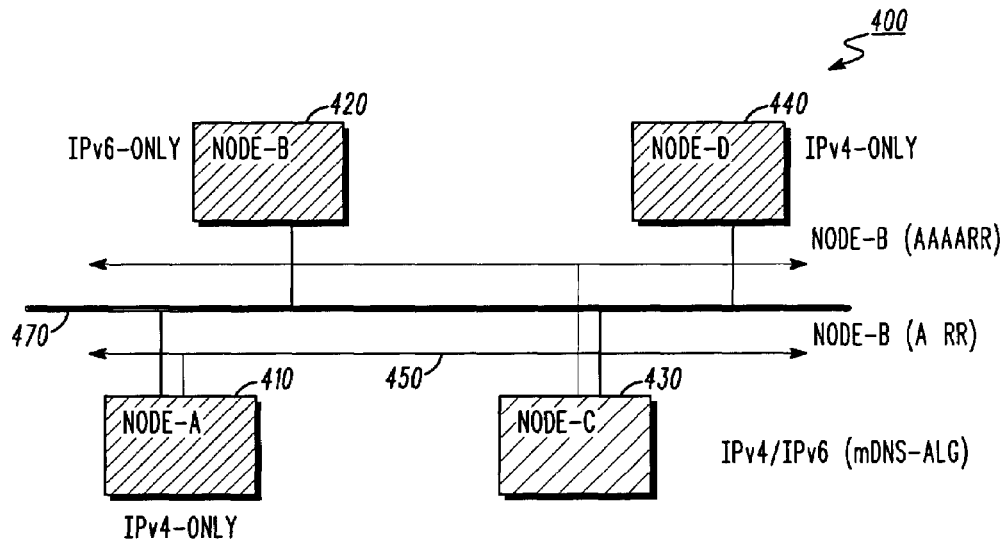
FIG. 4 is a schematic block diagram representation of a multicast domain name system network according to an embodiment of the present invention.

FIG. 4 shows an mDNS network 400 in which several host computers Node-A 410, Node-B 420, Node-C 430 and Node-D 440 are physically connected on a transmission link 470. The transmission link 470 includes transmission media suitable for propagating signals according to the network protocol utilised, and each node has a suitable interface mechanism for propagating and receiving such signals. For example, the Rendezvous networking technology produced by Apple Computer Inc. may be practised to form at least part of the mDNS network 400 of FIG. 4. However, the network 400 is not limited in its application to Rendezvous.

Nodes on the transmission link 470 communicate with each other using either the IPv4 or IPv6 protocol stacks. The IPv4 and IPv6 connections are shown schematically as protocol link IPv4 and protocol link IPv6 respectively, for purposes of illustrating relevant concepts only. The IPv4 and IPv6 protocol links 450 and 460 are multicast DNS connections running over IPv4 and IPv6, respectively. Node-A 410 and Node-D 440 are capable of communicating on the IPv4 protocol. Node-B 420 is configured to operate on the IPv6 protocol. Node-C 430 is a dual-stack host that is able to communicate on each of the IPv4 and IPv6 protocols.

In a first example, Node-A 410, an IPv4-only host, wants to communicate with Node-B 420, an IPv6-only host. As there are no configured DNS name servers on the network, multicast DNS is used. Accordingly, Node-A 410 multicasts a name resolution request for Node-B's address resource record (A RR), which is Node-B's IPv4 address. As Node B 420 is an IPv6-only host, Node-B 420 can only communicate on the IPv6 protocol and thus does not detect the multicast DNS request intended for Node-B on the IPv4 protocol layer 450.

Node-C 430 acts as an mDNS-ALG dual-stack host and consequently detects all messages multicast on each of the protocol links IPv4 450 and IPv6 460. Thus, Node-C 430 receives the multicast request from Node-A 410 and initiates a timer. After waiting a predetermined time, Node-C 430 sends a multicast name resolution request for Node-B's addresses using each of the IPv4 and IPv6 protocols. As described above in respect of step 350, the multicast name resolution request sent by Node-C 430 may take the form of two separate mDNS requests, one using each of the respective IPv4 and IPv6 protocols. Alternatively, Node-C 430 may send a single mDNS request containing multiple queries for A and AAAA/A6 RRs.

Node-C 430 sends a multicast name resolution request for Node-B's IPv4 address, known as Node-B's A RR, on the IPv4 link 450. Node-B 420 does not detect the IPv4 request from Node-C 430 and accordingly no IPv4 reply is forthcoming from Node-B 420 to Node-C 430 on the IPv4 link. Node-C 430 also sends a multicast name resolution request for Node-B's IPv6 address, known as Node-B's AAAA/A6 RR, using the IPv6 link 460. Node-B 420 detects the multicast message sent on the IPv6 protocol 460 and sends an IPv6 reply back to Node-C 430. From these interactions, Node-C 430 determines that Node-B 420 is only capable of IPv6 communication and protocol translation is required to facilitate communications between the IPv4 Node-A 410 and the IPv6 Node-B 420. The protocol translation is implemented by a translation mechanism, which is invoked by Node-C 430. The translation mechanism may include a translator or a proxy.

Figure 5:
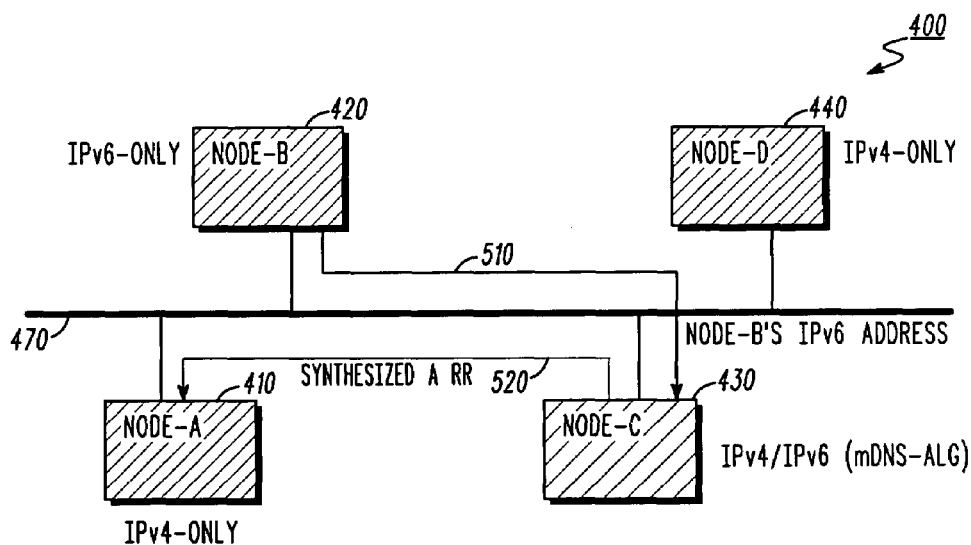
FIG. 5 a schematic block diagram representation showing a synthesized address being forwarded in the multicast domain name system network of FIG. 4.

FIG. 5 shows the reply 510 from Node-B 420 to Node-C 430 in the multicast network of FIG. 4. The reply 510 provides Node-C 430 with Node-B's IPv6 address. Having determined that protocol translation (e.g., using a translator or proxy) is required for Node-A 410 and Node-B 420 to communicate, Node-C 430 synthesizes an appropriate RR and sets up the necessary configuration needed by the translator or proxy. Node-C 430 sends a DNS reply 520 to Node-A 410 containing a synthesized address for communicating with Node-B.

III. Synthesis of Addresses

Table 1 shows the synthesis performed by mDNS-ALG functionality of the dual-stack host Node-C 430. The mDNS-ALG synthesizes an appropriate RR to return a requested address type to the requesting host Node-A 410. The synthesized address returned to Node-A 410 has a special prefix. When Node-A 410 sends packets to Node-B 420, Node-A 410 uses the synthesized address. A translator/proxy listening to the network detects the special prefix embedded in the address and provides the appropriate translation/proxying to establish a connection to Node-B 420. For example, the translator/proxy may be implemented using NAT-PT, as disclosed in "*Network Address Translation—Protocol Translation (NAT-PT)*" G. Tsirtsis and P. Srisuresh (2000), IETF RFC 2766. The translator/proxy may also be implemented using FaithD, as disclosed in "*An IPv6-to-IPv4 Transport Relay Translator*" J.-I. Hagino and Kazu Yamamoto (2001), IETF RFC 3142.

The special prefixes embedded in the addresses by the DNS-ALG are predefined and specific to a given network. An example of an IPv4 prefix is 169.254.1.x, where the subnet "1" indicates, in accordance with an arbitrary, predefined network configuration, that the address has been allocated for translation/proxying purposes. The value x is assigned for each IPv6 host with which an IPv4 wants to communicate. In another example, the address range 169.254.1.220 to 169.254.1.254 is allocated for translation/proxying purposes. In this case, hosts on the same link must not allocate addresses from this reserved address range. To ensure the address range is reserved, the dual-stack host must defend the allocated addresses whenever it detects another host trying to allocate an address from the reserved address range.

An example of an IPv6 prefix is fe80::ffff::/96, where the value "ffff" designates the address as a translatable IPv6 address. The notation "/96" is a decimal value specifying the number of leftmost contiguous bits that comprise the prefix. The lower 32-bits of the IPv6 address contain the IPv4 address of the target IPv4 host. For example, a host with an IPv4 address of 169.254.3.4 has an IPv6 address of fe80::ffff::a9fe:0304, where a9fe:0304 is the colon-hexadecimal representation of 169.254.3.4.

A system administrator of a site is free to choose any address range in the IPv4 and IPv6 address space. Care has to be taken such that the chosen addresses do not refer to legitimate hosts within and outside the network. For example, if a system administrator assigns the address 172.16.0.1 to a host, then the special address cannot be chosen from the range 172.16.0.x, because if the address 172.16.0.1 is returned as a special address, packets are directed to the translator/proxy instead of the host. Further, packets destined for the translator/proxy will likely be routed to the host instead of the translator/proxy. Therefore, the wrong choice in address range effectively "black-holes" a given host or the translator/proxy itself.

Table 1 lists outputs from an mDNS-ALG and corresponding stored states. The table shows examples of special addresses that are returned to a requesting host depending on the capabilities of the requesting host. Note that a host's capability is inferred from the RR type requested. Thus, if a host requests an A RR, the mDNS-ALG assumes that the host functions in accordance with the IPv4 protocol. Conversely, if a host requests an AAAA/A6 RR, the mDNS-ALG assumes that the host functions in accordance with the IPv6 protocol.

TABLE 1

| Communication Scenario | RR Requested | Returned RR | State Stored at mDNS-ALG |
|---|---|---|---|
| IPv4 to IPv6 | A | 169.254.x.y | 169.254.x.y to IPv6 Mapping |
| IPv6 to IPv4 | AAAA/A6 | 65152.0.65535.IPv4 (fe80::ffff:IPv4) | None |

Table 1 shows that an mDNS-ALG returns to IPv4 hosts wanting to communicate with IPv6 hosts an IPv4 address in the range 169.254.x.y, where the values "x" and "y" are chosen dynamically by the mDNS-ALG. The mDNS-ALG returns to IPv6 hosts wanting to communicate with IPv4 hosts an IPv6 address of the form 65152.0.65535.IPv4, where IPv4 is the IPv4 address of the IPv4 host. IPv6 addresses are commonly expressed in colon-hexadecimal notation, in which a 128-bit IPv6 address is divided along 16-bit boundaries. In the colon-hexadecimal notation, the returned IPv6 address 65152.0.65535.IPv4 is represented as fe80::ffffIPv4.

It is generally accepted in the IPv6 community that addresses embedded with "ffff" are recognised as translatable addresses. Further details of IPv6 addressing can be found in "*IP Version 6 Addressing Architecture*" Rob Hinden (1995), IETF RFC 1884.txt The special addresses shown in the third column of Table 1 have link-local scope. These addresses are valid only for hosts that are connected on the same link of the given network. The address range 169.254.x.y is defined in "*Dynamic Configuration of IPv4 Link-Local Addresses*", Stuart Cheshire, Bernard Aboba and Erik Guttman (2002), IETF draft-ietf-zeroconf-ipv4-linklocal-07.txt. The IPv6 prefix fe80:/16 is defined in "*IP Version 6 Addressing Architecture*", Rob Hinden (1995), IETF RFC 1884.txt.

Table 1 also shows the state stored by the mDNS-ALG for each special IPv4 address returned to an. IPv4 host. The stored state is either empty ("none"), or contains mappings of IPv4 addresses to IPv6 addresses. No state is stored at the mDNS-ALG for the IPv6 to IPv4 scenario, because the IPv4 address is embedded in the returned IPv6 RR. The mDNS-ALG may also record other information, such as the lifetime for which the mappings remain valid.

IV. Link-Local and Site-Wide Scopes

For IPv4 unicast communications, the address range denoted by the prefix 169.254/16 is reserved for link-local communication, as described in "*Dynamic Configuration of IPv4 Link-Local Addresses*, <draft-ietf-zeroconf-ipv4-*linklocal-07txt*>" Stuart Cheshire, Bernard Aboba and Erik Guttman (2002), IETF draft , (23$^{rd}$ August 2002). Packets bearing a link-local address are not routed outside a given link of a network. Thus, a router on a given link is not permitted to forward any link-local packets off that link. In IPv6, an address range denoted by the prefix fe80:/10 has been designated as link-local scope.

The level above link-local is site-local scope. Site-local addresses must be routable within a site. In IPv4, there are no address ranges that are designated as having site-local scope. To enforce the "scope" of an address, routers at the border of a site, such as a single gateway in a home network, drop packets bearing a given site-local address, thus preventing these packets from leaving the home network. Private address ranges are dropped by border routers, as private address ranges are forbidden from appearing on the Internet. Different address ranges may be used if the appropriate controls have been placed at border routers to drop packets bearing a designated site-local address.

For IPv4 multicast communications, a set of multicast addresses has been allocated by the Internet Engineering Task Force (IETF) for use. In multicast communications, the concept of site-local also exists, but is implemented through a time-to-live (TTL) variable within each multicast packet. A link-local multicast packet has a TTL of one. A router on the link decrements the TTL to zero and discards the packet to ensure that the link-local multicast packet is not routed outside a given link of a network. For site-local scope, the TTL is set according to the size of the network to ensure multicast packets reach all interested parties.

In IPv6 communications, the prefix fec0::/10 is designated for site-local communication, as described in "*Internet Protocol Version 6 (IPv6) Addressing Architecture*" Rob Hinden and Steve Deering (2003), IETF RFC 3153. IPv6 also specifies the scope of multicast addresses. Every multicast address has a predefined prefix that defines the scope of that multicast address. Thus, each router only has to check the prefix of a multicast address to determine whether to forward that multicast address.

Link-local IPv4 and IPv6 addresses may be used as special prefixes if all participating hosts, including the translator/proxy, are on the same link of a given network. If all the participating hosts are not on the same link of the network, special prefixes are chosen from a site-wide or global-scope address range. To determine which special address scope to choose from, the mDNS-ALG checks the source address of the DNS query. If the query originates from a link-local scope address, the mDNS-ALG returns a synthesized RR composed from a link-local special address. Otherwise, the mDNS-ALG uses a site-local or global-scoped special address.

Once the special address is chosen, the translator/proxy assigns the address to its interface as an alias so that packets directed to the special address are intercepted and directed to the translator/proxy.

Table 2 lists outputs from an mDNS-ALG. The table shows examples of different scopes of addresses returned in response to a request from a source host. The scope of the address returned in each scenario depends on the scope of the address of the source host. For this example, the prefixes 169.254.1 and 172.17.1 are defined as translatable addresses in the IPv4 domain.

TABLE 2

| Source Address on Multicast DNS Query | Returned Special Address |
|---|---|
| 2002:0aee:5354::0aee:5354 (Globally Scoped) | 2002:0aee:5354:ffff::<IPv4-Address> |
| fec0::cece:dede (Site Scoped) | fec0::ffff:<IPv4-Address> |
| 169.254.4.3 | 169.254.1.1 |
| 172.16.1.3 | 172.17.1.1 |

In the first scenario, a globally-scoped IPv6 source host 2002:0aee:5354::0aee:5354 sends a multicast request. The mDNS-ALG determines that the request originates from a globally-scoped IPv6 address and returns a synthesized IPv6 RR composed from a globally-scoped special address, 2002:0aee:5354:ffff::<IPv4-Address>.

In the second scenario, the source host has a site-wide IPv6 address. The mDNS-ALG returns a site-wide IPv6 special address, fec0::ffff:<IPv4-Address>. In the third scenario, the source host has an IPv4 address. The mDNS-ALG returns a special IPv4 address, 169.254.1.1. In the final scenario, the source host has an IPv4 address, 172.16.1.3. The mDNS-ALG returns a special IPv[4] address, 172.17.1.1.

V. Example of IPv6 to IPv4 Communication

Figure 6:
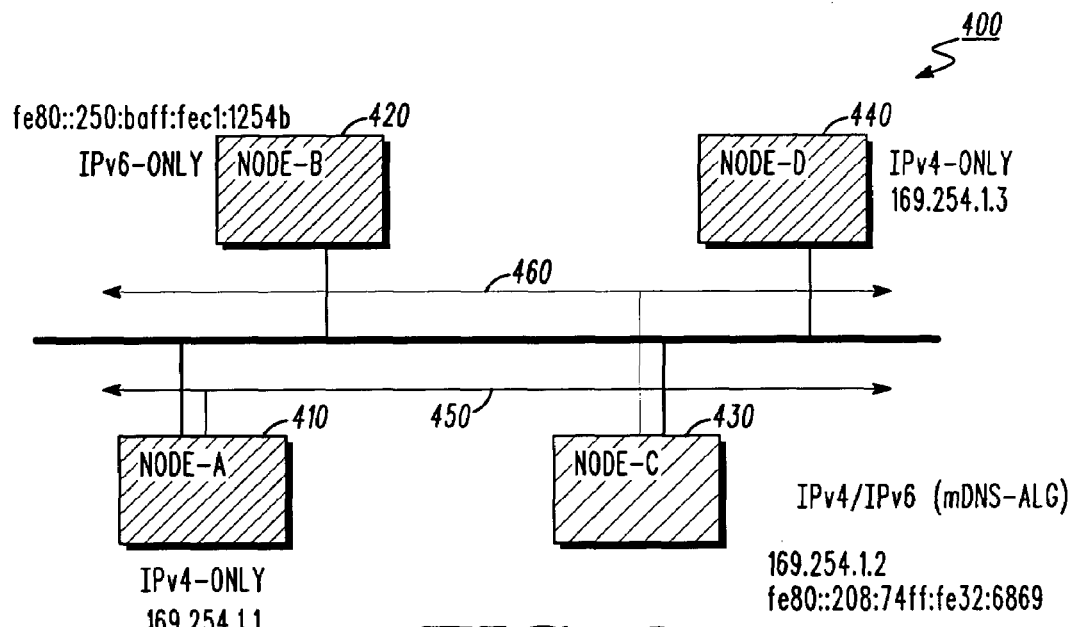
FIG. 6 a schematic block diagram representation showing allocated IPv4 and IPv6 addresses in the multicast domain name system network of FIG. 4.

FIG. 6 shows the mDNS network of FIGS. 4 and 5. In this example, Node-A 410, Node-B 420, Node-C 430 and Node-D 440 are connected on the same link. The nodes are assigned the following addresses:

Node-A 169.254.1.1
Node-B fe80::250:baff:fec1:254b
Node-C 169.254.1.2 and fe80::208:74ff:fe32:6869
Node-D 169.254.1.3

Further, this example assumes that addresses in the range 169.254.1.220 to 169.254.1.254 are reserved for communications from IPv4 to IPv6 hosts, and the prefix "fe80::ffff::/96" is designated as a translatable address for communication from IPv6 to IPv4 hosts.

If an application running at Node-B 420, such as an IPv6 browser, wants to communicate with an application running at Node-A 410, such as an IPv4 web-server, Node-B 420 sends an IPv6 multicast DNS query to obtain Node-A 410's IP address. Each node attached to the link and listening on an IPv6 multicast address detects the DNS query from Node-B 420 and checks whether the query matches that node's hostname. Node-A 410 is an IPv4 host and consequently does not detect the IPv6 multicast DNS query from Node-B 420.

Node-C 430 is a dual-stack host that listens on IPv4 and IPv6 multicast addresses. Further, Node-C 430 is equipped with an mDNS-ALG. The mDNS-ALG contained in Node-C 430 performs one or more multicast DNS queries to resolve the IPv4 and IPv6 multicast addresses of Node-A 410. The DNS specification provides that multiple queries may be contained within a single DNS packet, so Node-C 430 may simultaneously ask for both A and AAAA/A6 RRs for Node-A 410.

Node-A 410 detects Node-C 430's multicast DNS query, as the query is sent to an IPv4 address. Node-A 410 determines that the query matches Node-A's hostname, processes the request and replies to Node-C 430 with the IPv4 address of Node-A 410. Node-C 430 receives the reply from Node-A 410 on the IPv4 protocol. As Node-C does not receive a reply on the IPv6 protocol, Node-C 430 determines that Node-A 410 only supports IPv4. Accordingly, Node-C 430 invokes protocol translation by synthesizing a special translatable IPv6 address. In this example, the translatable IPv6 address is fe80::ffff::169.254.1.1, which is implemented as fe80::ffff::a9fe:0101.

The mDNS-ALG of Node-C 430 creates an alias on a network interface listening to the communication channel using the synthesized address. If a translator/proxy is not co-located with the mDNS-ALG, the alias must be created at the node in which the translator/proxy resides.

The mDNS-ALG then creates a DNS reply containing the synthesized IPv6 address for Node-A 410 and transmits a unicast message to Node-B 420. Node-B 420 receives the synthesized address and initiates a connection to the address fe80::ffff::169.254.1.1. Packets sent from Node-B 420 bearing the synthesized address are detected by Node-C given that the synthesized address is an alias of the network interface listening on the communication channel. Node-C 430 passes the packets to the translator/proxy due to the embedded "ffff" in the address indicating translation is required. The translator/proxy extracts the embedded IPv4 address and proceeds to perform translation/proxy of the connection.

VI. Example of IPv4 to IPv6 Communication

In the next example, using the same network components depicted in FIG. 6, an application at IPv4 Node-A 410 sends a multicast query asking for IPv6 Node-B 420's name. The multicast query is detected by all hosts on the network listening on an IPv4 address. As Node-B 420 is an IPv6 host, Node-B 420 does not detect the request from Node-A 410. Node-C 430 detects the request from Node-A 410 and sends one or more multicast DNS queries on each of the IPv4 and IPv6 protocols to determine the capabilities of Node-B 420. Node-B detects the IPv6 query from Node-C 430 and sends a unicast reply to Node-C 430 containing the IPv6 address of Node-B 420.

Node-C 430 receives the IPv6 reply from Node-B 420, but no IPv4 reply. Node-C 430 concludes that Node-B 420 is an IPv6-only host. Accordingly, the mDNS-ALG of Node-C allocates an IPv4 address 169.254.1.220 to Node-B 420. This address may be arbitrary and can be chosen using the process described above. The mDNS-ALG then creates a mapping that maps the address 169.254.1.220 to Node-B's IPv6 address. The mDNS-ALG at Node-C 430 then creates an alias on the network interface attached to the communication channel using the address 169.254.1.220. As noted in the preceding example, if a translator/proxy is not co-located with the mDNS-ALG, the alias must be created at the node in which the translator/proxy resides.

The mDNS-ALG then creates a DNS reply containing the address 169.254.1.220 and sends the reply to Node-A 410. Node-A 410 receives the reply from Node-C 430 and attempts to establish a connection with address 169.254.1.220, which Node-A believes to be the IPv4 address of Node-B 420. Node-C 430 detects packets from Node-A 410 to the address 169.254.1.220 and passes those packets to the translator/proxy for processing. The translator/proxy asks the mDNS-ALG for an IPv6 mapping of the IPv4 address 169.254.1.220. If no mapping exists in the mDNS-ALG, the translator/proxy terminates the connection. If a mapping does exist, the translator/proxy uses the mapping returned from the mDNS-ALG to establish a connection with the target IPv6 host Node-B 420.

VII. Further Embodiments

Figure 7:
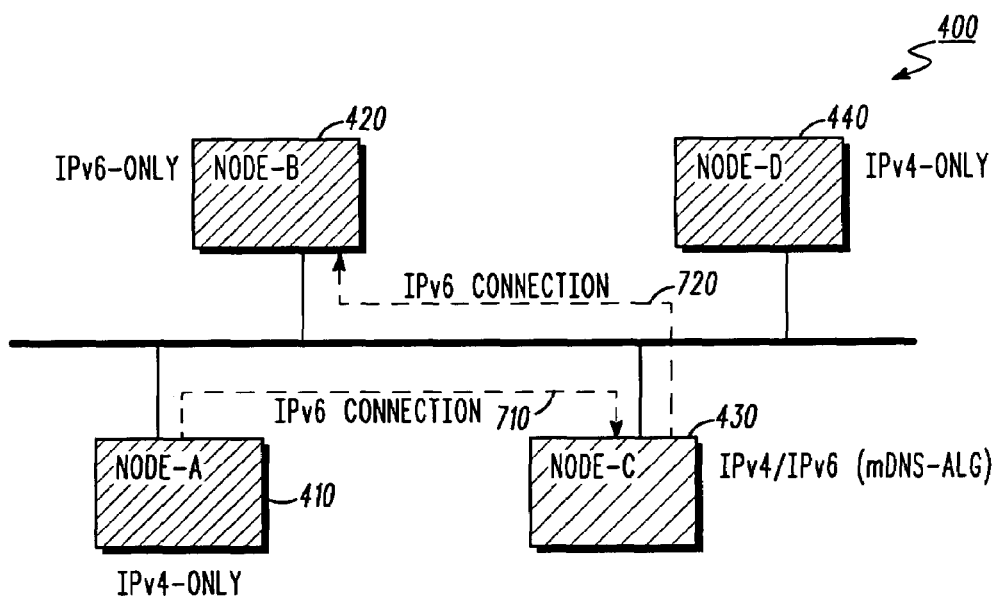
FIG. 7 is a schematic block diagram representation of translation/proxying of addresses for the multicast domain name system network of FIG. 4.

FIG. 7 shows establishment of end-to-end communication from IPv4 Node-A 410 to IPv6 Node-B 420 using the synthesized address described above in respect of FIG. 5 and Table 1. In the example shown, Node-C 430 contains a translator/proxy, and the synthesized address 520 is the address of the translator/proxy. It will be understood by those skilled in the art that the translator/proxy functionality may reside elsewhere in the network. However, if the translator/proxy is not co-located with the mDNS-ALG of Node-C 430, additional signalling mechanisms are required to notify the translator/proxy of any created states and to obtain a special prefix to be used in the DNS reply.

Node-A 410 sends an IPv4 request 719 using the synthesized address 520. Node-A establishes a connection to the translator/proxy in Node-C and is unaware that the connection is being translated into IPv6. The translator/proxy then establishes an IPv6 connection 720 to Node-B 420. In this manner, the IPv4 host Node-A 410 and the IPv6 host Node-B 420 are able to communicate with one another.

The value of the timer used in the dual-stack host is preferably determined by experimentation in an operating environment. The value of the timer is set to ensure that sufficient time elapses to prevent translation or proxying being used instead of a compatible connection. Such a situation might arise if the mDNS-ALG of the dual-stack host responds more quickly than the destination host, resulting in the source host utilising a sub-optimal connection resulting from the translation process. The timer threshold is such that the destination host has sufficient time to reply to the source host's original request.

The above example illustrates the establishment of a connection from a source IPv4 host to a destination IPv6 host. The same principles allow the establishment of a connection from a source IPv6 host to a destination IPv4 host in a multicast system such as the one described.

In a further example, an mDNS-ALG dual-stack host may be employed in a routed network. In the example above, link-local multicast addresses are used when sending out DNS queries. In the home network scenario, hosts can send queries using a site-local multicast address. In such an arrangement, the mDNS-ALG listens to the network and detects a DNS query with a site-local multicast address. The mDNS-ALG responds in the same manner as the site-local case. However, care must be taken to ensure that the special address used to synthesize the RR is of site-scope. For example, fec0::ffff::/96 for IPv6 RRs, and 172.16.x.y for IPv4 RRs.

When implemented for site-wide communication rather than a link-local embodiment, the mDNS-ALG listens to a site-wide scope IPv4 or IPv6 address. An example of a site-scope multicast IPv4 address is 239.0.0.37, with the appropriate time-to-live field set. An example of a site-scope multicast IPv6 address is ff05::100. When an address space is designated as having link-scope, only hosts connected to the same link can use it. A router connected to the link enforces the link scope by preventing packets with destination set to a link-scope address from being forwarded outside the link. For site-local scope, border routers of a given site are configured to discard packets with site-local scope addresses. The discard rules at the routers are typically configured manually or by manufacturers if such discard rules are well known.

For example, fec0::ffff::/96 is a suitable site-wide address range for IPv6 RRs, and 172.16.x.y is a suitable site-wide address range for IPv4 RRs In a routed network, the address returned to a source host must be an address that is routable across links. The returned address must have scope larger than the link-local scope. The address 172.16.x.y is chosen arbitrarily, and another IPv4 address space could be chosen, provided the addresses are valid in a given site and are routable across links. Similarly for IPv6, the prefix "fec0::/16" is chosen arbitrarily and another IPv6 prefix can be used provided routing tables are configured to forward any packets destined to an IPv6 address with an embedded "ffff" to the corresponding translator/proxy.

Figure 8:
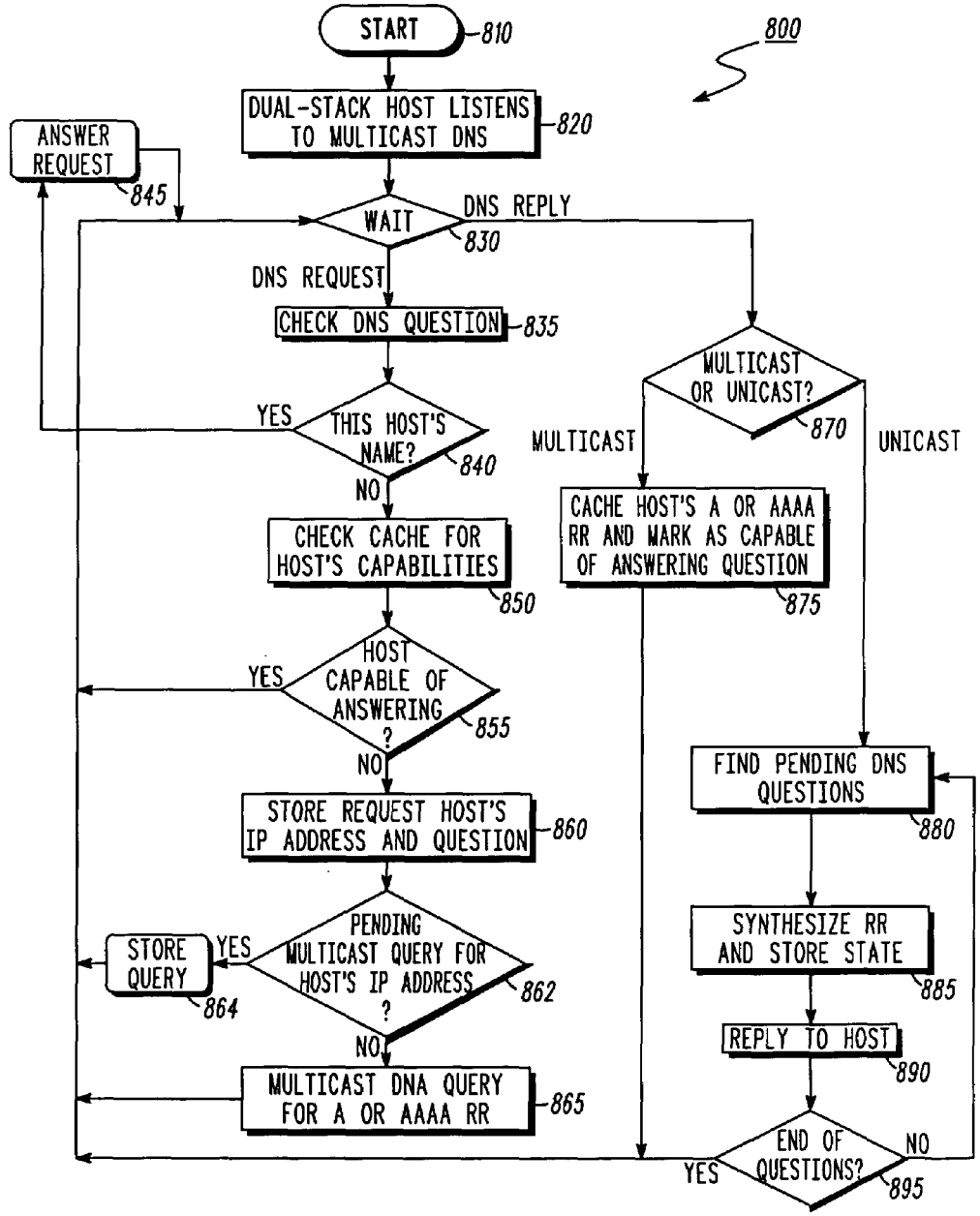
FIG. 8 is a flow diagram of a method of invoking protocol translation in a multicast domain name system network according to a further embodiment of the present invention.

FIG. 8 is a flow diagram of a method 800 of invoking protocol translation in a multicast domain name network. At the start 810, an mDNS network having several hosts connected thereto is idle. There is no central DNS name server connected to the network. At step 820, a dual-stack host with mDNS-ALG functionality listens to the multicast network for passing communications traffic. The dual-stack host waits at decision step 830 until a message from a source host is detected on the network.

The dual-stack host assesses whether the message is a DNS request or a DNS reply. If the message is a DNS request, the dual-stack host checks the DNS question in step 835. Processing flows to decision step 840, in which the dual-stack host determines whether the DNS request received in step 830 is addressed to the dual-stack host ("This host's name?"). If the DNS request received in step 830 is addressed to the dual-stack host (Yes), processing passes to step 845, in which the dual-stack host answers the request. After the dual-stack host has answered the request, processing passes to decision step 830 where the dual-stack host waits until a further message from a source host is detected on the network.

If at step 840 the dual-stack host determines that the DNS question is intended for a destination host on the network other than the dual-stack host (No), processing proceeds to step 850 in which the dual-stack host checks a cache to determine whether the capabilities of the intended destination host are known. Processing flows to decision step 855, in which the dual-stack host determines whether the destination host is capable of answering the DNS request from the source host. If the destination host operates on the same protocol as the source host and is capable of answering the request (Yes), nothing further is required of the dual-stack host and processing returns to step 830, whereupon the dual-stack host waits to detect the next message on the network.

If, however, the dual-stack host determines at step 855 that the destination host is unable to answer the request from the source host (No), processing flows to step 860 and the dual-stack host stores the IP address of the source host (i.e., the Request Host) and the question contained in the DNS request. Processing passes to decision step 862 which determines whether there are any pending multicast queries for the destination host's IP address. If there are pending requests (Yes), processing passes to step 864 in which pending query(-ies) is (are) stored. Processing then returns to the wait state 830. If at decision step 862 there are no pending multicast queries for the destination host's IP address (No), processing passes to step 865, in which the dual-stack host transmits a multicast DNS query for the intended destination host's IPv4 and IPv6 addresses (A or AAAA/A6 RR). Processing then returns to step 830 as the dual-stack host awaits a reply from the intended destination host.

When a DNS reply is detected at step 830, the dual-stack host determines whether the message is unicast or multicast at decision step 870. If the DNS reply is a multicast message, processing flows to step 875, in which the dual-stack host updates the cache to indicate that the host responsible for sending the DNS reply is capable of answering DNS questions on the protocol on which the message was received. That is, the Host's A or AAAA/A6 RR is cached and marked as capable of answering the question. Processing then returns to step 830 as the dual-stack host awaits further messages on the multicast network.

If, however, the DNS reply is determined at step 870 to be a unicast message, the message is a reply directed to the dual-stack host in response to an earlier query generated at step 865. Processing passes to step 880 and the dual-stack host finds which DNS questions are pending. Processing then flows to step 885, in which the dual-stack host synthesizes the relevant RR from the source of the unicast message and stores the state. Then, in step 890, the dual-stack host sends a reply to the source host responsible for the pending question under scrutiny. Processing passes to step 895 and the dual-stack host determines whether there are any further questions pending. In order to reduce the number of multicast messages transmitted in a network, it is efficient to transmit multiple questions for a single hostname in one multicast request. If there are more questions remaining (No), processing loops to step 880. However, if there are no further questions pending (Yes), processing returns to step 830 and the dual-stack host awaits further messages on the multicast network.

The principles of the preferred method described herein have general applicability to multicast computer network environments. However, for ease of explanation, the steps of the preferred method are described with reference to the Internet computer network. However, it is not intended that the present invention be limited to the described method.

The method and apparatus disclosed above facilitate communication among hosts on a multicast network supporting different protocols by determining when protocol translation is necessary.

The detailed description provides a preferred, exemplary embodiment only, and is not intended to limit the scope, applicability, or configuration of the invention. Rather, the detailed description of the preferred, exemplary embodiment provides those skilled in the art with enabling descriptions for implementing a preferred, exemplary embodiment of the invention. It should be understood that various changes may be made in the function and arrangement of elements without departing from the spirit and scope of the invention as set forth in the appended claims.

I claim:

1. A method of invoking protocol translation in a multicast network supporting first and second protocols, the method comprising:

detecting a first multicast request sent from a source host to a destination host using a first protocol;

sending, after a predetermined time, a second multicast request to said destination host using each of said first and second protocols;

invoking protocol translation to facilitate communication between said source host and said destination host, if a reply to said second multicast request is received from said destination host using said second protocol and no reply is received from said destination host using said first protocol, wherein translation comprises: generating a proxy address using the first protocol for the destination host, forwarding the proxy address to the source host, creating an alias on a network interface at a translation mechanism in the multicast network, and assigning the proxy address to the aliased network interface to enable the translation mechanism to detect and process packets addressed to the proxy address;

sending a unicast request from the source host intended for the destination host using the proxy address using the first protocol;

detecting the unicast request at the aliased network interface by the translation mechanism;

processing of the unicast request by the translation mechanism to determine an address for the destination host using the second protocol; and forwarding the unicast request by the translation mechanism to the destination host using the second protocol to establish a connection from the source host to the destination host.

2. The method according to claim 1, wherein said reply received from said destination host using said second protocol is a unicast reply.

3. The method according claim 1, wherein said first and second protocols are each selected from the group of protocols consisting of Internet Protocol version 4 (IPv4) and Internet Protocol version 6 (IPv6).

4. The method according to claim 1 wherein said translation mechanism is selected from the group of translation mechanisms consisting of a translator and a proxy.

5. The method according to claim 1, wherein said multicast network is a multicast domain name system network.

6. A system for invoking protocol translation in a multicast network supporting first and second protocols, said system comprising:

a network interface for communicating with said network;

a memory for storing information;

a processor coupled to said memory and said network interface; and a dual-stack host implemented using said memory and said processor:

detecting a first multicast request sent from a source host to a destination host using a first protocol, sending, after a predetermined time, a second multicast request to said destination host using each of said first and second protocols, invoking protocol translation to facilitate communication between said source host and said destination host, if a reply to said second milticast request is received from said destination host using said second protocol and no reply is received from said destination host using said first protocol, wherein the protocol translation comprises: generating a proxy address using the first protocol for the destination host, forwarding the proxy address to the source host, creating an alias on a network interface at a translation mechanism in the multicast network, and assigning the proxy address to the aliased network interface to enable the translation mechanism to detect and process packets addressed to the proxy address, sending a unicast request from source host intended for the destination host using the proxy address using the first protocol, detecting the unicast request at the aliased network interface by the translation mechanism, processing of the unicast request by the translation mechanism to determine an address for the destination host using the second protocol, and forwarding the unicast request by the translation mechanism to the destination host using the second protocol to establish a connection from the source host to the destination host.

7. The system according to claim 6, wherein said first and second protocols are selected from the group consisting of Internet Protocol version 4 (IPv4) and Internet Protocol version 6(IPv6).

8. The method according to claim 6, wherein said dual-stack host comprises:

A multicast domain name system application level getaway (mDNS-ALG).

9. The system according to claim 6, wherein said multicast network is a multicast domain name system network.

* * * * *